United States Patent [19]
Strawn et al.

[11] 3,822,555
[45] July 9, 1974

[54] MARINA PROTECTIVE WAVE BREAKER

[76] Inventors: L. C. Strawn, P.O. Box 1145;
Vernon W. Stanton, Sr., P.O. Box 693, both of Tucumcari, N. Mex. 88401

[22] Filed: Mar. 12, 1973

[21] Appl. No.: 340,098

[52] U.S. Cl. .................................................. 61/6
[51] Int. Cl. ............................................ E02b 3/04
[58] Field of Search ................................... 61/6, 1

[56] References Cited
UNITED STATES PATENTS

| | | | |
|---|---|---|---|
| 843,926 | 2/1907 | Brasher | 61/6 |
| 3,068,655 | 12/1962 | Murray et al. | 61/6 |
| 3,103,788 | 9/1963 | Gross | 61/6 |
| 3,452,966 | 7/1969 | Smolski | 61/6 X |
| 3,651,646 | 2/1972 | Grunau | 61/6 X |

Primary Examiner—Robert R. Mackey
Assistant Examiner—Philip C. Kannan
Attorney, Agent, or Firm—Henry Heyman

[57] ABSTRACT

A simplified air burst wave breaker for the protection against wave action of Marina installations and the like. The air burst unit comprises a duct in the form of two vertical U portions arranged with their openings toward each other, having a common leg and in which at least the bottom free leg is longer than the common leg. The lower free leg provides a water inlet stem and the upper free leg provides the air burst or burp outlet stem. The U portion open at the bottom an air inlet connection in the upper bend thereof.

7 Claims, 5 Drawing Figures

PATENTED JUL 9 1974 3,822,555

MARINA PROTECTIVE WAVE BREAKER

BACKGROUND OF THE INVENTION

Marina installations and other floating structures are subject to severe wave damage resulting from storm winds of unusual velocity. Stationary solid breakwaters are expensive, and not expedient for use in lakes in which the water level may very considerably due to the effect of rainfall on the one hand and irrigation usage on the other hand. It is desirable to provide a breakwater which can be submerged to a depth of noninterference with boating but which is effective to break up waves at the surface of the water. A desirable wavebreaker which is effective for the purpose, which is relatively inexpensive, which can be submerged to avoid interference with boating and fishing and which can be operated economically is the air bubble type of installation.

The concept of the air bubble wavebreaker is old in the art. For example, the utilization of small air bubbles passing upward through a body of water to break and diminish waves is disclosed in Brasher U.S. Pat. No. 843,926 issued on Feb. 12, 1907. In addition, Brasher U.S. Pat. No. 1,593,863 issued July 27, 1926 discloses that the intermittent release of bubbles can effectively serve to break up waves with more efficient expenditure of compressed air. The use of air release devices which alternately fill with water and air to abruptly release the air to form large bubbles or burps is disclosed in U.S. Pat. No. 3,068,655 to Murray et al. issued Dec. 18, 1962. The present invention concerns a much simplified air burst generator and air bubble screen apparatus for wave breaking having particular advantages in the protection of economically limited installations such as lake marinas and the like.

The air burst generator or burper of the present invention is simple and rugged and has the advantage that commercially available plastic materials such as polyethelene, polyvinal, chloride chlorinated polyvinal chloride, butadiene-styrene, rubber styrene and the like pipe and fittings are readily applicable to their fabrication. A plurality of the burpers are strung in a level submerged position across the lake to provide the wavebreaker barrier. The burpers are connected to a compressed air line from which air is metered into each of the burpers at a selected rate which is easily controllable by adjustment of the air pressure. The units are intended to be submerged to an appreciable depth such as thirty feet for example for avoidance of contact with surface objects and to obtain enhancement of the wave breaking effect of the air bursts due to their expansion to double the size of the originally emitted bubbles by the time the air bursts break the surface.

The operation of the device is simple and automatic. Compressed air introduced at the top of the U adjacent to the inlet stem forces water equally, substantially, out of the inlet stem and the common leg of the U sections until air starts to pass into the outlet stem. The weight of the water in the outlet stem is immediately reduced so that water rushes into the inlet stem with increasing velocity resulting in the stored air being violently ejected in a sudden gush out of the top of the outlet stem. Air again starts to accumulate at the metered rate to repeat the process. The air pressure fed to the burpers exceeds the hydrostatic pressure existing at the depth at which the units are submerged. The frequency of discharge is controlled by regulating the air pressure in the connecting manifold which in turn controls the period at which the burpers discharge.

It is desirable to secure the burpers and associated apparatus at a depth which avoids interference with passing boats and fishing tackle. Where the nature of the lake body admits, a depth such as 30 feet is considered desirable.

The burper of the present invention comprises a molded or fabricated duct in the form of two integrally connected oppositely directed U sections having a common leg and having at least the lower free leg of a length at least slightly in excess of the common leg. One free leg which is open upward is termed the outlet stem and the other free leg which is open downward is termed the inlet stem. In other words the functional position of the unit is such that it is supported so that the U section which is open downwardly includes the inlet stem and the U section which is open upward includes the outlet stem. An air inlet fixture is attached to and communicates with the top bend of the downwardly open U section. The U sections may be joined in any selected orientation ranging from lying in a common plane to form a lazy S to that orientation in which the inlet and outlet stems are adjacent each other, i.e., side by side similar to bugle shape. The latter configuration admits of a more compact construction and increased strength because the inlet and outlet stems can be attached to each other by any binding means such as cement, encircling bands or one or more through fasteners such as bolts.

In anchored operating position, the burper unit is intended to be supported by buoyant and weighting means so that the inlet and outlet stems are vertical or substantially vertical. Some variation from the vertical is permissible as long as the inlet stems extends below the bottom band of the upwardly open U section. Air introduced into the air inlet duct displaces water to an equal extent, substantially, from the inlet stem and the common leg of the U sections until air commences to enter the bottom of the outlet stem. At this stage in the cycle, the weight of the water in the outlet stem is reduced below the pressure of the water in the inlet stem with the result that the imbalance in pressure increases at a rapid rate and water rushes into the inlet stem to fill the entire device and in so doing, abruptly expells the air previously accumulated in a sudden gush out of the top of the outlet stem. Immediately thereafter, air again starts to accumulate in the duct to repeat the process. The pressure of the air fed to the plurality of burpers forming the breakwater chain is selected to exceed the hydrostatic pressure of the water at the selected level of submersion of the burpers. The frequency of discharge of the air bubbles may be selectively controlled by regulating the rate of introduction of air into the units.

Other objects, features and advantages of the invention will appear from the detailed description which will now be given of illustrative embodiments shown in the accompanying drawings in which.

Figure 1:
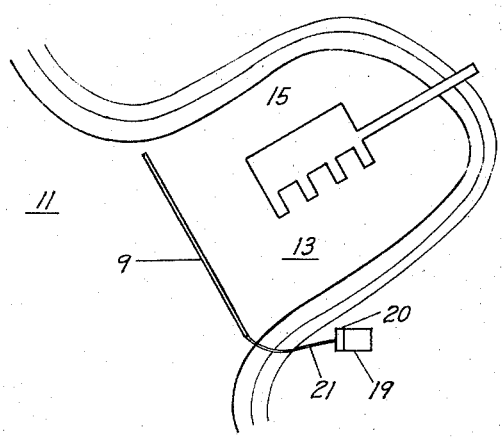
FIG. 1 is a horizontal illustrative view of a Marina situated in a lake portion protected by the breakwater of the present invention.

Referring now to FIG. 1 of the drawings, the wavebreaker 9 of the present invention is adapted to be attached to the shore at least at the air compresser end for installation across the lake or other body of water to provide a wave breaker barrier between the main body of water 11 and the water 13 situate about the Marina and small boat mooring zone 15. A source of compressed air 19 and a pressure reducer 20 is supported on the shore and is connected to the burpers by a compressed air line manifold 21. In permanent installations it may be desired to bury the shore portion of the compressed air line for protection against physical damage.

Figure 2:
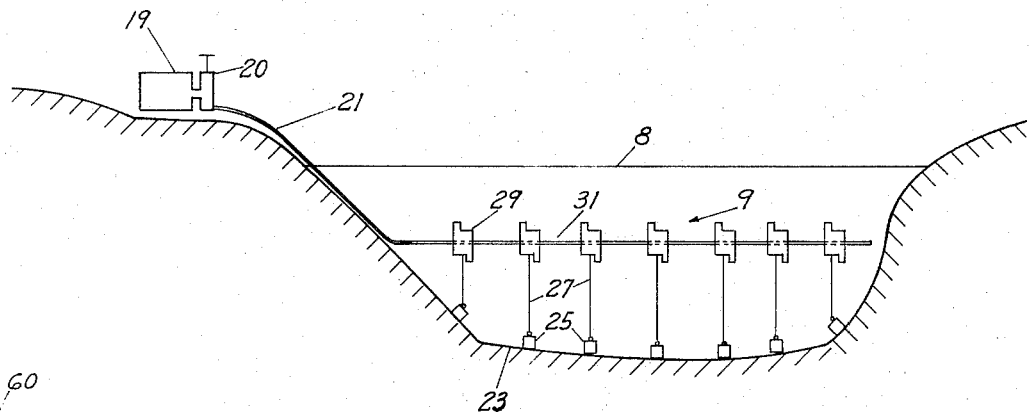
FIG. 2 is a diagrammatic vertical plan view of the breakwater of the present invention in functional position.

The manner of supporting the burper chain in submerged position is shown in FIG. 2. The floor of the lake 9 under the selected wave breaker barrier is indicated by reference numeral 23. The burper chain is provided with means for buoyancy such as by a hollow air manifold 31 or buoys 60 and is prevented from rising by a plurality of anchors 25 and tie lines 27. It is generally preferred to maintain the burper chain on a horizontal level line in order that the compressed air in the air feeder line operates against equal static water pressure at all of the burpers 29 to achieve approximately the same frequency of burping at all the burpers. The burpers 29 are shown diagrammatically in FIG. 2. The manifold line 31 in this version is a hollow plastic tube which provides the functions of buoyancy, air delivery, and position fixation.

When the burper chain is prepared at the time of submersion or fabrication, the depth of the lake bottom 23 is sounded to provide the measurement for the length of anchor lines 27. The depth is not critical but when feasible it is preferred to submerge the burper line to a deep depth such as for example thirty feet so that the bursts of air emerging at the surface are double the volume when emitted at the burpers to enhance the wavebreaker effect. The deep depth additionally, in most instances avoids contact with trolling fishlines and hooks although, the construction of the burpers and connecting ducts is such as to inhibit being snagged by fishhooks.

Figure 3:
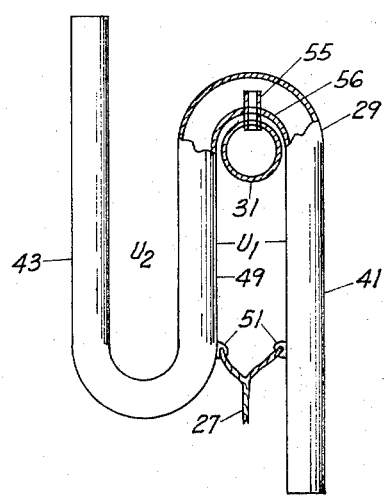
FIG. 3 is a side plan view of one embodiment of the bumper of the present invention.
Figure 5:
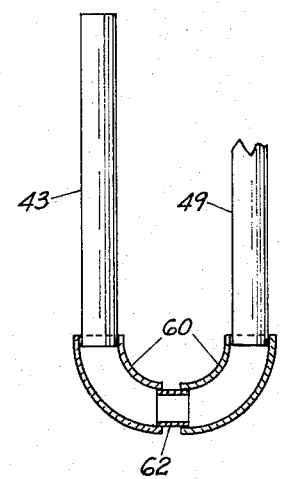
FIG. 5 is a side plan view partly in section showing fabrication from commonly shaped plumbing fixtures and parts.

FIG. 3 shows one configuration of the simplified burper of the present invention. Basically the unit comprises an inverted U tube $U_1$ connected by a common leg 49 to an upright U tube $U_2$. The inlet leg 41 of $U_1$ must be longer than common leg 49. This configuration may be termed a lazy S. The length of inlet leg 41 is chosen of a length to prevent air escape when legs 49 and 41 are filled with air from inlet 55 until the bottom level of the air reaches the level of the bend between legs 49 and 43. At this point the weight of the water in leg 43 plus the static water pressure at the top of stem 43 becomes less than the static pressure at the bottom of stem 41 less the weight of the water in stem 41. The difference in pressures increases rapidly as air enters leg 43 resulting in water rapidly filling the burper resulting in the sudden discharge of the stored air as a large bubble or air burst at the upper end of leg 43. The air burst enlarges as it enters lower water pressures as it ascends to the top.

Figure 4:
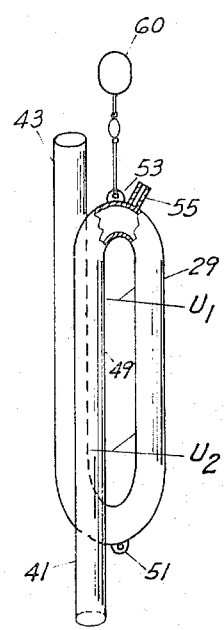
FIG. 4 is a slightly oblique side view of an alternative embodiment of the burper of the present invention.

FIG. 4 shows an alternative configuration of the burper of the present invention. In this embodiment $U_1$ and $U_2$ are in substantially opposition, forming a loop of bugle shape. An advantage of this shape lies in its compactness and adaptability to be threaded at the bend of $U_1$ by the air manifold for both buoyancy and compressed air feed.

The burpers of both embodiments may be provided with means 51 for affixing anchor lines 27 to a bottom portion and buoy fastening means 53 when additional buoyancy or buoy markers are desired. Air manifold 31 in the embodiment of FIG. 4 is provided with a short stub tube 60 of selected internal diameter which may be cemented in apertures in manifold 31 or other types of air supply and the bottom of the bend of inverted $U_1$. In cases where the air manifold, i.e., the line of burpers, is too long for uniform air pressure to be presented to all the burpers, the internal diameter of the stub tubes or connector 55 to each burper is correlated with the calculated pressure at each burper to obtain substantially equal air admission.

The burper of FIG. 3 may also be provided with buoyant support by either resting on an air manifold inserted under the bend of inverted $U_1$ as shown or by buoys. If buoys are used, the airline connected to air inlet fixture 55 may be of any size suitable for the correct delivery of air without regard for adequate buoyancy.

In any case it is desired that the direction of buoyancy pull and anchor pull be on a common vertical line to maintain the burper in correct vertical attitude. The burpers can also be maintained in a sufficiently vertical attitude if the manifold line is affixed to the burpers and is maintained in the correct radial direction by fixtures attached thereto and to anchor lines.

While several illustrative embodiments of the invention have been described in detail various modifications may become apparent to those skilled in the art to which the invention relates. Accordingly it is not desired to limit the invention to this disclosure and various modifications and equivalents may be resorted to, falling within the spirit and scope of the invention as claimed.

What is claimed as new is:

1. A pneumatic breakwater apparatus which comprises a source of compressed air connected to air burpers spacedly supported along the length of the breakwater, each of said burpers comprising an inverted U shaped duct and an upright U shaped duct, said U-shaped ducts having a common leg, said inverted U shaped duct having its free leg of a length longer than the common leg and being the water inlet leg, air injection means connected to and communicating with the curved portion of the inverted U and the source of compressed air, means attached to the breakwater apparatus for maintaining said burpers with the U shaped ducts substantially upright and in a submerged uniform level position.

2. The apparatus of claim 1 in which the compressed air source is a pipeline which is buoyant and exerts a lift force to the breakwater apparatus to maintain its position by tensioning the means for maintaining the burpers upright and in submerged uniform level position.

3. The pneumatic breakwater apparatus of claim 2 in which anchor lines are affixed at spaced intervals along the breakwater chain and respectively have a length equal to the distance between the in situ position of a respective portion of the pipe line and the ground level beneath the water at the in situ position.

4. The apparatus of claim 1 in which the inverted and upright U shaped ducts lie in a common plane and in operative position approximating a lazy S with elongated ends.

5. The apparatus of claim 4 in which the lazy S burper is attached to the compressed air source which is buoyant, and has anchor line attaching means affixed to mean position between the legs of the inverted U duct.

6. The apparatus of claim 1 in which the inverted U-shaped duct and the upright U-shaped duct are folded about the common leg to approximate a bugle fold.

7. The apparatus of claim 6 in which the compressed air source threads each of the burpers at the top portion of the inverted U and is connected thereto by air passages of selected size to meter the air into the burpers at a rate to effect a desired air burst repetition rate.

* * * * *